United States Patent [19]

Concannon

[11] 4,351,882
[45] Sep. 28, 1982

[54] ARTICLE COATED WITH FLUOROPOLYMER FINISH WITH IMPROVED DURABILITY

[75] Inventor: Thomas P. Concannon, Newtown Square, Pa.

[73] Assignee: E. I. Du Pont de Nemours and Company, Wilmington, Del.

[21] Appl. No.: 224,684

[22] Filed: Jan. 13, 1981

[51] Int. Cl.³ .................... B32B 27/00; B32B 27/06
[52] U.S. Cl. ............................................. 428/422
[58] Field of Search ........................... 428/422, 421

[56] References Cited

U.S. PATENT DOCUMENTS

| | | | |
|---|---|---|---|
| 3,946,136 | 3/1976 | Fitz | 428/422 |
| 4,128,693 | 12/1978 | Ohami | 428/422 |
| 4,180,609 | 12/1979 | Vassiliou | 428/212 |
| 4,252,859 | 2/1981 | Concannon | 428/422 |

FOREIGN PATENT DOCUMENTS 12434  6/1980  European Pat. Off. ............ 428/422

OTHER PUBLICATIONS

U.S. Patent Application Serial No. 956,349 filed 10/31/78 by Concannon and Vary.

Primary Examiner—Sam Silverberg
Attorney, Agent, or Firm—Richard H. Burgess

[57] ABSTRACT

Articles coated with multilayers of a composition of polytetrafluoroethylene plus a specified proportion of copolymers of perfluorinated polyvinyl ether and tetrafluoroethylene, to which is optionally added a heat stable polymer with a glass-transition temperature greater than or equal to 130° C., are found to have improved durability. The proportion of the copolymer in each layer varies such that there is a maximum amount in the bottom layer with decreasing proportions in the other layer or layers.

17 Claims, 1 Drawing Figure

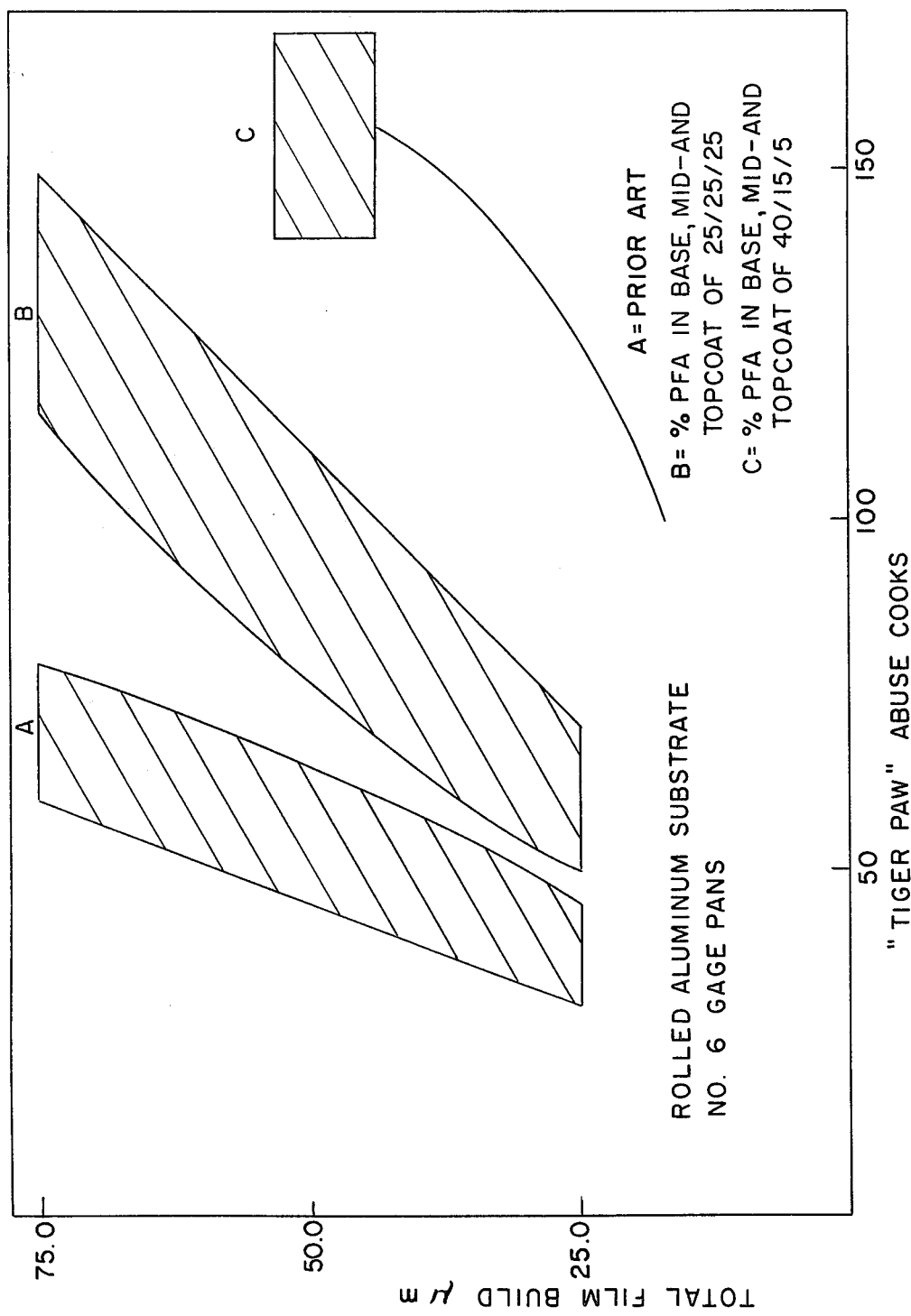

ARTICLE COATED WITH FLUOROPOLYMER FINISH WITH IMPROVED DURABILITY

BACKGROUND OF THE INVENTION

It is widely recognized that coating compositions based on fluorocarbon polymers, especially polytetrafluoroethylene (PTFE), serve the useful purpose of providing a nonstick surface on various articles. The cookware industry in particular has found the use of fluoropolymer finishes to be advantageous.

While cookware bearing such finishes is generally quite durable, manufacturers of nonstick cookware continue to try to improve coating compositions so that the ultimate user can have a product of superior characteristics which will last as long as possible. The same goal exists with respect to nonstick-coated articles other than cookware.

There are many patents relating to articles coated with a fluoropolymer composition of enhanced durability. Representative of some of the more recent in U.S. Pat. No. 4,180,609 issued to Vassiliou Dec. 25, 1979, directed to an article multicoated with a fluoropolymer composition which contains mica particles, mica particles coated with pigment, or metal flake in varying proportions in the different coats.

Of particular importance to the present invention in U.S. Patent application Ser. No. 956,349 filed Oct. 31, 1978 now U.S. Pat. No. 4,252,859 by Concannon and Vary, directed toward a coating composition containing a blend of PTFE and copolymers of perfluorinated polyvinyl ether and tetrafluoroethylene (TFE). This coating composition exhibited reduced crystallinity and a longer useful life than would be expected from averaging the properties of the unblended resins themselves.

SUMMARY OF THE INVENTION

The present invention provides an article comprising a substrate having on it multiple coatings including a basecoat directly on the substrate, which basecoat is overlaid by at least one other coat, and wherein the basecoat is derived from a composition consisting essentially of, by weight:

(a) 15–65% of a particulate polymer of monoethylenically unsaturated hydrocarbon monomers completely substituted with fluorine atoms or a combination of fluorine and chlorine atoms, the polymer having a number average molecular weight of at least 20,000;

(b) 30–50% of at least one of a particulate copolymer containing
   (i) 99.5–92% of tetrafluoroethylene,
   (ii) 0.5–8%, preferably 3%, of at least one perfluorinated vinyl ether having the formula:

$$CF_2=CF-O-R_f$$

in which $R_f$ represents one or more perfluoroalkyl radicals having from 1 to 10 atoms or a particulate perfluorinated ether having the formula:

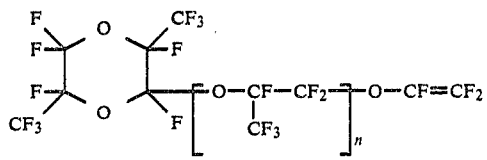

in which n is zero to 4, and, optionally,
   (iii) hexafluoropropylene; and
(c) 0–25% of a polymer having a glass-transition temperature (Tg) greater than or equal to 130° C. which is also thermally stable at temperatures up to 200° C.;

and wherein the other coats are derived from a composition consisting essentially of (a), (b) and (c), with the concentration of (b) being at least 10% by weight, and also less than or equal to 0.75 times the proportion of (b) in the basecoat composition, and the concentration of (c) being 0–15%. (Percentages and proportions herein are by weight except where indicated otherwise.)

BRIEF DESCRIPTION OF DRAWING

The sole FIGURE of the drawing is a graphic representation of the improved durability performance of the invention as compared to prior art.

DETAILED DESCRIPTION OF THE INVENTION

U.S. Patent application Ser. No. 956,349 filed Oct. 31, 1978 by Concannon and Vary teaches the use of a blend of PTFE and perfluorinated vinyl ether copolymers of TFE and perfluoro(propyl vinyl ether) (PPVE), the copolymers referred to as PFA. (Except where indicated otherwise, the PPVE content of PFA is approximately 3%.) The utility of such a PTFE-PFA blended coating composition was illustrated by means of abuse cooking tests using an apparatus referred to herein as a "Tiger Paw". The test involved a device simulating a metal fork which was stirred at constant pressure around both sides of a pan with different coatings on the right and left sides. One side was coated with a commercial coating composition with PTFE as the sole fluorocarbon while the other side was coated with a PTFE-PFA blend. It was discovered that the addition of PFA, within a specified range, provided a coating that was significantly tougher, more scratch-resistant, less permeable, more elastic and less brittle than PTFE coatings. These factors led to longer useful lives for cookware bearing coatings of the PTFE-PFA blend, as compared to cookware with only a PTFE coating composition.

The present invention provides for an article comprised of a substrate which may be formed from, e.g., aluminum, carbon steel, stainless steel, glass or ceramic. This article bears multicoats of a PTFE-PFA blend to which is optionally, but preferably, added a polymer having a glass-transition temperature (Tg) greater than or equal to 130° C. which is also thermally stable at temperatures up to 200° C. While Concannon et al. (Ser. No. 956,349) describe a multicoat system, they do not recommend different proportions of PFA in different layers. The present invention involves the discovery that the addition of a thermally stable polymer with a high Tg and the specific variation of the proportion of PFA in the different coats, e.g., base-, mid- and topcoat, result in an article bearing a unique finish with optimal durability and release characteristics. For cookware, a preferred three-coat system was discovered in which the proportion of PFA and high Tg, thermally stable polymer in each coat was related to the function of each coat. In the basecoat, it is desirable to maximize adhesion, strength and toughness while minimizing porosity. The midcoat must provide toughness and excellent intercoat adhesion as well as elasticity and recovery potential. Finally, the topcoat must exhibit superior release properties in addition to intercoat adhesion.

The PFA in the coating composition has the value of adding toughness and elasticity to the PTFE. The PFA melts and flows into the PTFE creating a new morphology which exhibits reduced crystallinity and increased elasticity. The decrease in crystallinity and increase in modulus of elasticity result in coatings which are less brittle, tending to spring back when deformed, and consequently more durable than prior art PTFE coatings. Furthermore, early work with PFA revealed that it exhibits superior substrate adhesion when compared to PTFE. For example, 100% PFA adheres strongly to smooth aluminum foil, while 100% PTFE can be easily stripped from aluminum. Similar results are obtained on stainless steel foil.

For these reasons, the largest proportion of PFA is used in the basecoat where adhesion, toughness and elasticity are critically important. While the proportion of PFA in the midcoat is less, it is enough to provide the toughness, elasticity and adhesion required. In the topcoat, the proportion of PTFE is maximized to take advantage of its release properties. However a small proportion of PFA is preferably present to provide improvements in toughness and elasticity so as to minimize light scratching.

Test data indicates that durability performance is more significantly affected by the % PFA in the basecoat than the percentage in the mid- and topcoats. While a large proportion of PFA is desirable in the basecoat, work with 50%, 75% and 100% PFA in the primer indicates that levels above 50% form less than desirable films, often leading to blisters on curing and severe cracking in the final films. Consequently, the preferred percentage of PFA in the primer is from 30-50%, more preferably 40-50%, and most preferably 40%. The % PFA is the mid- and topcoats of the three-coat system is not as critical. Various considerations including performance and cost indicate the % PFA in the midcoat should be at least 10% and less than or equal to 0.75 times % PFA in the primer, more preferably less than or equal to 0.50 times % PFA in the primer, and most preferably 0.375 times % PFA in the primer. The % PFA in the topcoat should be less than or equal to 0.250 times % PFA in the primer, more preferably less than or equal to 0.20 times % PFA in the primer, and most preferably 0.125 times % PFA in the primer.

The thermally stable polymer having a Tg greater than or equal to 130° C. can serve a very useful purpose in a coating composition, especially in a system designed for cookware where the coating can be exposed to very high temperatures. As an amorphous polymer is raised through its glass-transition temperature, it changes from a hard and brittle material to a soft and rubbery one. The Tg of PTFE is 127° C. while the Tg for the PTFE-PFA blend is slightly lower. When cookware bearing coatings of PTFE or the PTFE-PFA blend is exposed to higher temperatures, especially such as might develop with carbon steel or stainless steel cookware, there can be a significant softening of the coating which may lead to decreased durability performance. However, it has been discovered that the addition of a thermally stable polymer with a Tg higher than the PTFE or PTFE-PFA blend can help counter this excessive softening, creating a tougher, harder coating of improved durability.

Those polymers which are suitable for such a purpose include, for example:
(1) Polybenzimidazoles,
(2) Polimide,
(3) Polyamide-Imide,
(4) Polythiazoles,
(5) Polyhydroxy Benzoic Acids (e.g., Carborundum Ekonals),
(6) Polyphenylenes (e.g., Gulf Thermid ® 600 series and Hercules H-resins),
(7) Polybenzoxazoles,
(8) Polyquinoxalines,
(9) Polyoxadiazoles
(10) Polytriazoles,
(11) Poly Aryl Sulfones or Poly Phenylene Sulfides as modified by a cyclization process as described in an article by A. Somers and C. S. Marvel in Journal of Polymer Science: Polymer Chemistry Edition, Vol. 18, 1511–1521 (1980).

By weighing such factors as the end-use and substrate of the coated article, one skilled in the art will be able to choose which one or ones of the above polymers may be suitable for any given system. Additionally, any polymer to be used in a system where the coated article is cookware must necessarily satisfy the appropriate FDA standards.

For a cookware system, the polyamide-imide polymer is preferred. This polymer has additional properties which make it useful in a coating composition. One, it forms an exceptionally strong adhesive bond with most metal substrates, especially aluminum and ferrous metals. In addition to its adhesive properties, it is added to the basecoat composition to minimize porosity so as to reduce chemical attacks on the metal substrate.

The coatings were prepared and applied by techniques known in the art and generally according to the teachings of U.S. Pat. No. 4,123,401 issued to Berghmans and Vary Oct. 31, 1978 and U.S. Pat. No. 4,122,226 issued to Vassiliou Oct. 24, 1978, among others. As noted earlier, the preferred system for cookware embraces a three-layer coating. A primer coat was sprayed onto bare metal which had been grit-blasted. Then the intermediate coating was sprayed on the primer. Finally, a topcoat was sprayed onto the intermediate coat. Although it is not necessary to dry or cure each coat before applying the next, it is sometimes preferable to permit some drying between coats. The recommended film build for this system is 38.1 $\mu$m to 45.7 $\mu$m with up to 7.62 $\mu$m of primer, 19.05 $\mu$m of midcoat and 19.05 $\mu$m of topcoat.

Although this is the optimum coating system for cookware, especially aluminum cookware, there are many other applications where a two-coat system would be preferred. Therefore, depending on the substrate and the end-use, the composition of the different layers and the recommended film build will vary to optimize release, hardness, adhesion, porosity or chemical inertness.

In the three-coat system, after all three layers have been applied, the coated substrate is baked to cure the coating, preferably at temperatures in the range of 340°–470° C., more preferably 385°–440° C., most preferably 420° C., for times up to one hour, preferably about 10 minutes; long enough, depending on the temperature, to cure the coating by causing coalescence.

While a variety of combinations of PTFE, polyamide-imide (PAI) and PFA were tried in each layer of: the coating the typical preferred coatings consist of:

| Ingredient | % Weight Solids in Each Ingredient | Each Ingredient as % Weight of Total Composition |
|---|---|---|
| Primer PTFE/PFA = 60/40 | | |
| PTFE dispersion | 60.0 | 20.82 |
| PFA dispersion (where PFA is a copolymer of 97% TFE and 3% PPVE) | 61.9 | 13.44 |
| Furfuryl alcohol | — | 1.22 |
| Deionized water | — | 27.83 |
| Water solution of amide-imide polymer from Amoco Chemicals Co. | 30.0 | 12.18 |
| Cobalt blue pigment dispersion | 45.0 | 10.43 |
| Silica sol dispersion | 30.0 | 14.01 |
| TiO$_2$-coated mica flake | 100.0 | 0.07 |
| Intermediate PTFE/PFA = 85/15 | | |
| PTFE dispersion | 60.0 | 57.23 |
| PFA dispersion | 61.9 | 9.79 |
| Deionized water | — | 6.36 |
| Channel black | 45.0 | 0.26 |
| Cobalt blue pigment dispersion | 45.0 | 0.26 |
| TiO$_2$-coated mica flake | 100.0 | 0.89 |
| Ce-octoate solution in 2-ethyl-hexanoic acid | — | 12.68 |
| Acrylic dispersion | 40.0 | 12.53 |
| Topcoat PTFE/PFA = 95/5 | | |
| PTFE dispersion | 60.0 | 66.58 |
| PFA dispersion | 61.9 | 3.31 |
| Deionized water | — | 4.18 |
| TiO$_2$-coated mica flake | 100.0 | 0.43 |
| Ce-octoate solution in 2-ethyl-hexanoic acid | — | 12.49 |
| Acrylic dispersion | 50.0 | 13.02 |

All dispersions are aqueous.

More details of the ingredients used are presented in U.S. Pat. No. 4,123,401 issued to Berghmans and Vary Oct. 31, 1978, and U.S. Pat. No. 4,122,266, issued to Vassiliou Oct. 24, 1978, both incorporated herein by reference, and especially in the examples of U.S. Pat. No. 4,123,401.

The most important component of the three-coat system is the PFA content in each layer. A comparison study was conducted to study the abuse cooking performance of a system wherein the % PFA (based on the total fluorocarbon content) in the base-, mid- and topcoat was 40/15/5. It was discovered that this particular system at a total film build of about 38.1 to 45.7 μm performed about 50% better than a system wherein the % PFA in the base-, mid- and topcoat was 25/25/25 and the total film build was comparable. See the accompanying drawing.

The drawing graphically illustrates the improved durability performance of the invention compared to prior art. The durability performance is measured by the number of "Tiger Paw" abuse cooks conducted before a coating system fails. As mentioned earlier, the test involves cooking certain specified foods while a device simulating a metal fork is stirred at constant pressure at a controlled elevated temperature (between 375° to 400° F.) around both sides of a pan with different coatings on the right and left sides. For this particular test, a coating system was deemed to have failed when it reached a scratch level of 3 on a scale of 0 to 10; 10 being where no scratching is evident and 0 being where all the coating in the scratch area is removed.

In the drawing, the shaded area under A represents the range of durability performance for prior art coated articles, represented by a multicoat system in which the different layers are derived from a composition containing PTFE and mica. The shaded area under B represents the improved durability range for a multicoated article of a PTFE-PFA blend outside the present invention where the % PFA in the base-, mid- and topcoat is 25/25/25. The shaded box under C represents an even more improved durability range for a system of the present invention in which the % PFA in the base-, mid- and topcoat is 40/15/5. The curved line below the box represents data collected where the film build was outside the shaded area of the box. At these film builds, however, there was insufficient data to suggest a range.

From the drawing, it is evident that the present invention which specifies the % PFA in each layer of a coated article results in an article bearing a unique finish combining optimal durability and superior release characteristics.

What is claimed is:
1. An article comprising a substrate having on it multiple coatings, including a basecoat directly on the substrate, which basecoat is overlaid by at least one other coat, and wherein the basecoat is derived from a composition consisting essentially of, by weight:
   (a) 15–65% of a particulate polymer of monoethylenically unsaturated hydrocarbon monomers completely substituted with fluorine atoms or a combination of fluorine and chlorine atoms, the polymer having a number average molecular weight of at least 20,000;
   (b) 30–50% of at least one of a particulate copolymer containing
      (i) 99.5–92% of tetrafluoroethylene,
      (ii) 0.5–8% of at least one perfluorinated vinyl ether having the formula:

in which R$_f$ represents one or more perfluoroalkyl radicals having from 1 to 10 atoms or a particulate perfluroinated ether having the formula:

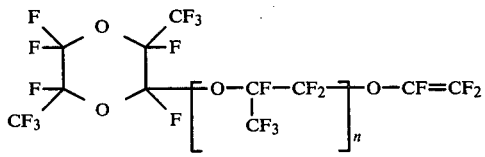

in which n is zero to 4, and, optionally,
      (iii) hexafluoropropylene; and
   (c) 0–25% of a polymer having a glass-transition temperature greater than or equal to 130° C. which is also thermally stable at temperatures up to 200° C.;

and wherein the other coats are derived from a composition consisting essentially of (a), (b) and (c), with the concentration of (b) being at least 10% by weight, and also less than or equal to 0.75 times the proportion of (b)

in the basecoat composition, and the concentration of (c) being 0–15%.

2. The article of claim 1 wherein the basecoat is overlaid with two coats of a composition consisting essentially of (a), (b) and (c) of claim 1, where the composition of the midcoat comprises, by weight, 55–90% (a), 10–30% (b), and 0–15% (c), and the composition of the topcoat comprises 80–100% (a), 0–10% (b), and 0–10% (c).

3. The article of claim 1 or 2 wherein (c) of the coating composition is selected from the group of polymers consisting of polybenzimidazoles, polyimide, polyamide-imide, polythiazoles, polyhydroxy benzoic acids, polyphenylenes, polybenzoxazoles, polyquinoxalines, polyoxadiazoles, and polytriazoles.

4. The article of claim 1 or 2 wherein (c) of the coating composition is a polyamide acid salt consisting essentially of the nonvolatile content of:
(a) 10–70% by weight, based on the solution, of a salt of a polyamide acid with a tertiary amine, wherein the polyamide acid is of the general formula

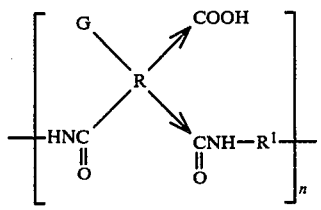

wherein G is a hydrogen atom or a carbonyl group; wherein the→denotes isomerism so that in any recurring unit within the polymeric structure the groups to which the arrows point may exist as shown or in an interchanged position; wherein R is an organic tetravalent radical containing at least two carbon atoms and no more than two carbonyl groups of each polyamide acid unit are attached to any one carbon atom; wherein $R^1$ is a divalent radical containing at least two carbon atoms, the amide groups of adjacent polyamide acid units are attached to separate carbon atoms of said divalent radical; and wherein n is an integer sufficient to provide a polyamide acid having an inherent viscosity of at least 0.1, preferably 0.3–5.0, as measured as a 0.5% solution in N,N'-dimethylacetamide at 30° C., and wherein said tertiary amine is present in at least a stoichiometrically equivalent amount to the free carboxylic acid groups in said polyamide acid;
(b) 5 to 25% by weight, based on the solution, of a viscosity reducing agent which is miscible with water and has a solubility parameter range of 10–21.6 wherein said solubility parameter has a dispersion component in the range of 7.0–10.0, a polar component in the range of 2.0–11.0, and a hydrogen bonding component in the range of 7.0–14.0;
(c) 5 to 35% by weight, based on the solution, of a coalescing agent, wherein said coalescing agent is at least one member selected from the group consisting of N-methylpyrrolidone, dimethyl formamide, dimethyl acetamide, dimethyl sulforide, eresylic acid, sulfolane, formamide; and wherein water comprises 30–80% by weight of the solution.

5. The article of claim 1 or 2 wherein (b) of the coating composition is one or more copolymers of perfluoroalkyl perfluorovinyl ethers with tetrafluoroethylene, said ether having the formula

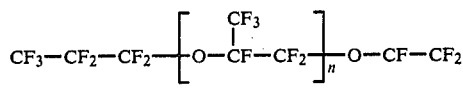

in which n is 1 to 4.

6. The article of claim 1 or 2 wherein (b) of the coating composition is a terpolymer consisting of, in copolymerized form,
(a) tetrafluoroethylene,
(b) between about 1 and 12 weight percent hexafluoropropylene, and
(c) between about 0.5 and about 6 weight percent of either perfluoro(ethyl vinyl ether) or perfluoro(n-propyl vinyl ether).

7. The article of claim 1 or 2 wherein (a) of the coating composition is polytetrafluoroethylene.

8. The article of claim 1 or 2 wherein (b) of the coating composition is a copolymer consisting of, in copolymerized form, polytetrafluoroethylene and 3% perfluoro(propyl vinyl ether).

9. The article of claim 2 which is an article of cookware.

10. The article of claim 1 or 2 wherein (c) of the coating composition is the nonvolatile content of a solution consisting essentially of:
(a) 25–45% by weight, based on the solution, of a salt of a polyamide acid with tertiary amine, wherein the polyamide acid is formed from trimellitic anhydride and bis(4-aminophenyl) methane and wherein the tertiary amine is a 4:1 to 1:4 by weight mixture of triethylamine and diethyl 2-hydroxyethylamine;
(b) 10–20% by weight, based on the solution, of furfuryl alcohol; and
(c) 10–25% by weight, based on the solution, of N-methylpyrrolidone.

11. The article of claim 1 or 2 wherein (c) of the coating composition is the nonvolatile content of a solution consisting essentially of:
(a) 25–45% by weight, based on the solution, of a salt of a polyamide acid with tertiary amine, wherein the polyamide acid is formed from trimetallitic anhydride and bis(4-aminophenyl) methane and wherein the tertiary amine is a 4:1 to 1:4 by weight mixture of triethylamine and diethyl 2-hydroxyethylamine;
(b) 10–20% by weight, based on the solution, of furfuryl alcohol; and
(c) 10–25% by weight, based on the solution, of N-methylpyrrolidone; and wherein water comprises 30–55% by weight of the solution.

12. The article of claim 1 wherein the basecoat is derived from a composition comprising 30–50% (a), 40–50% (b), and 10–20% (c) and a single topcoat is derived from a composition of (a), (b) and (c) comprising 0–10% (c) and wherein (b) is at least 15% and also less than or equal to 0.50 times the proportion of (b) in the basecoat.

13. The article of claim 2 wherein the basecoat is derived from a composition comprising 30–50% (a), 40–50% (b) and 10–20% (c); the midcoat is derived from a composition comprising 70–80% (a), 15–20% (b) and 5–10% (c); and the topcoat is derived from a composition comprising 85-93% (a), 4-8% (b) and 3-7% (c).

14. The article of claim 2 wherein the basecoat is derived from a composition comprising 30-50% (a), 40-50% (b) and 10-20% (c); the midcoat is derived from a composition comprising 70-80% (a), 15-20% (b) and 0-10% (c); and the topcoat is derived from a composition comprising 85-93% (a), 4-8% (b) and 0-7% (c).

15. The article of claim 2 wherein the ratio of (a) to (b) is 60/40 in the basecoat, 85/15 in the midcoat, and 95/5 in the topcoat.

16. The article of claim 1 or 2 wherein (a) of the coating composition is polytetrafluoroethylene, (b) is as described in claim 8, and (c) is as described in claim 10.

17. The article of claim 16 wherein a basecoat is derived from a composition consisting essentially of, by weight, 58.68% (a), 37.88% (b) and 3.44% (c); a midcoat of 85.39% (a), 14.60% (b) and 0% (c); and a topcoat of 95.26% (a), 4.74% (b) and 0% (c).

* * * * *